United States Patent
Wong et al.

(10) Patent No.: US 11,799,310 B2
(45) Date of Patent: Oct. 24, 2023

(54) X-CAPACITOR DISCHARGE METHOD, X-CAPACITOR DISCHARGE CIRCUIT AND SWITCHED-MODE POWER SUPPLY

(71) Applicant: Joulwatt Technology Co., Ltd., Hangzhou (CN)

(72) Inventors: Pitleong Wong, Hangzhou (CN); Mengyi Huang, Hangzhou (CN)

(73) Assignee: JOULWATT TECHNOLOGY CO., LTD., Hangzhou (CN)

( * ) Notice: Subject to any disclaimer, the term of this patent is extended or adjusted under 35 U.S.C. 154(b) by 255 days.

(21) Appl. No.: 17/399,083

(22) Filed: Aug. 11, 2021

(65) Prior Publication Data
US 2022/0216701 A1    Jul. 7, 2022

(30) Foreign Application Priority Data

Jan. 4, 2021    (CN) .......................... 202110001874.9
Feb. 7, 2021    (CN) .......................... 202110167193.X

(51) Int. Cl.
| H02M 1/44 | (2007.01) |
| H02M 1/32 | (2007.01) |
| H02M 7/06 | (2006.01) |
| H02J 7/00 | (2006.01) |

(52) U.S. Cl.
CPC .............. H02J 7/007 (2013.01); H02M 1/44 (2013.01); H02M 7/06 (2013.01); *H02J 2207/50* (2020.01); *H02M 1/322* (2021.05)

(58) Field of Classification Search
CPC ................................ H02M 1/322; H02M 1/44
See application file for complete search history.

(56) References Cited

U.S. PATENT DOCUMENTS

| 10,411,584 B2 * | 9/2019 | Huang | ................... H02M 1/126 |
| 2003/0016068 A1 * | 1/2003 | Logiudice | ................ G11C 5/14 |
| | | | 327/365 |
| 2011/0176341 A1 * | 7/2011 | Huang | ................... H02M 1/126 |
| | | | 363/49 |

(Continued)

FOREIGN PATENT DOCUMENTS

| CN | 102684453 A | * | 9/2012 | |
| EP | 2552001 A2 | * | 1/2013 | ............ H02M 1/126 |

(Continued)

*Primary Examiner* — Sisay G Tiku
(74) *Attorney, Agent, or Firm* — Bayramoglu Law Offices LLC

(57) ABSTRACT

An X-capacitor discharge method applied to a switched-mode power supply, wherein the switched-mode power supply comprises an X-capacitor, a rectifier circuit and a switching circuit; the X-capacitor discharge method comprises: arranging a first diode, wherein an anode of the first diode is connected to a first end of the X-capacitor, and a cathode of the first diode is configured as a first node; when it is detected that a voltage of the first node is higher than a first voltage threshold, pulling down the first node through a first sampling current, and performing a timing; and if a time for which the voltage of the first node continues to be higher than the first voltage threshold reaches a first threshold time, pulling down the first node through a first pull-down current. An X-capacitor discharge circuit applied to the switched-mode power supply is provided.

22 Claims, 12 Drawing Sheets

(56) References Cited

U.S. PATENT DOCUMENTS

| | | | |
|---|---|---|---|
| 2012/0105016 A1* | 5/2012 | Moon | H02M 1/36 |
| | | | 320/166 |
| 2012/0207505 A1* | 8/2012 | Kobayashi | H02M 1/32 |
| | | | 399/88 |
| 2013/0027999 A1* | 1/2013 | Ptacek | H02M 1/36 |
| | | | 363/126 |
| 2015/0263542 A1* | 9/2015 | Sato | H02J 7/345 |
| | | | 320/166 |
| 2019/0074761 A1* | 3/2019 | Matsuda | H02M 1/32 |
| 2019/0123633 A1* | 4/2019 | Huang | H02M 1/126 |
| 2019/0379276 A1* | 12/2019 | Huang | H02M 1/126 |
| 2020/0127555 A1* | 4/2020 | Matsuda | H02M 3/33523 |
| 2020/0127571 A1* | 4/2020 | Matsuda | H02M 1/32 |
| 2020/0303941 A1* | 9/2020 | Inoue | H02M 3/137 |
| 2020/0304031 A1* | 9/2020 | Inoue | H02M 1/36 |
| 2023/0094128 A1* | 3/2023 | Yang | H02M 1/0054 |
| | | | 363/21.12 |

FOREIGN PATENT DOCUMENTS

| | | | | |
|---|---|---|---|---|
| JP | 2012170289 A | * | 9/2012 | H02M 1/32 |
| KR | 20120090607 A | * | 8/2012 | |

\* cited by examiner

X-CAPACITOR DISCHARGE METHOD, X-CAPACITOR DISCHARGE CIRCUIT AND SWITCHED-MODE POWER SUPPLY

CROSS REFERENCE TO THE RELATED APPLICATIONS

This application is based upon and claims the priority to Chinese Patent Application No. 202110001874.9, filed on Jan. 4, 2021, and the priority to Chinese Patent Application No. 202110167193.X, filed on Feb. 7, 2021, the entire contents of which are incorporated herein by reference.

TECHNICAL FIELD

The present invention relates to the technical field of power electronics, and more particularly, to an X-capacitor discharge method, an X-capacitor discharge circuit and a switched-mode power supply.

BACKGROUND

In order to reduce the interference of alternating current (AC)/direct current (DC) power supply to the power grid and improve the electro-magnetic interference (EMI) performance of the system, an electro-magnetic interference suppression capacitor (i.e. X-capacitor) is connected in parallel to the AC input. After the AC input is powered off, a residual voltage remains in the X-capacitor. Since this residual voltage may cause harm to people, the safety standards stipulate that the voltage on the X-capacitor must be reduced to be below a certain value within a certain period of time after the power has been turned off. Referring to FIG. 1, the capacitor C01 is an X-capacitor, and the resistor R01 is the discharge resistor of the X-capacitor. The larger the capacitance of the X-capacitor is, the smaller the resistance of the resistor is required, to discharge the X-capacitor. The resistor R01, however, will dissipate a lot of power during normal operation of the system, thus reducing the efficiency of the system. Therefore, in terms of the AC/DC power supply, it is highly desirable to develop an X-capacitor discharge circuit capable of discharging the X-capacitor in accordance with the safety certification requirements, while dissipating minimal power during normal operation of the system.

SUMMARY

In view of the above, the objective of the present invention is to provide an X-capacitor discharge method with high discharge efficiency, an X-capacitor discharge circuit, and a switched-mode power supply to solve the problems in the prior art that the discharge efficiency of the X-capacitor is low, and a power off of the input is misdiagnosed in case that the input is severely distorted.

In order to achieve the above-mentioned objective, the present invention provides an X-capacitor discharge method applied to a switched-mode power supply. The switched-mode power supply comprises an X-capacitor, a rectifier circuit and a switching circuit. An alternating current (AC) input passes through the X-capacitor and the rectifier circuit to obtain an input voltage of the switching circuit. The X-capacitor discharge method comprises arranging a first diode. An anode of the first diode is connected to a first end of the X-capacitor, and a cathode of the first diode is configured as a first node.

When it is detected that a voltage of the first node is higher than a first voltage threshold, the first node is pulled down through a first sampling current, and a first timing is performed; and if a time for which the voltage of the first node continues to be higher than the first voltage threshold reaches a first threshold time, the first node is pulled down through a first pull-down current.

Optionally, the X-capacitor discharge method applied to the switched-mode power supply further comprises arranging a second diode. An anode of the second diode is connected to a second end of the X-capacitor, and a cathode of the second diode is configured as a second node.

When it is detected that a voltage of the second node is higher than a second voltage threshold, the second node is pulled down through a second sampling current, and a timing is performed; and if a time for which the voltage of the second node continues to be higher than the second voltage threshold reaches a second threshold time, the second node is pulled down through a second pull-down current.

Optionally, when it is detected that the voltage of the first node is lower than the first voltage threshold, the first node is pulled down through the first sampling current, and a timing is performed; if a time for which the voltage of the first node continues to be lower than the first voltage threshold reaches a third threshold time, the switching circuit is activated to discharge the input voltage, so that the input voltage is less than the first voltage threshold.

Optionally, a safety time comprises a first time period and a second time period; when it is detected that the voltage of the first node is higher than the first voltage threshold, within the safety time, the first node is not pulled down during the first time period, and the first node is pulled down through the first sampling current during the second time period. The first sampling current is greater than a threshold current.

Optionally, the threshold current is set according to a maximum parasitic capacitance of the first node.

Optionally, the X-capacitor discharge method applied to the switched-mode power supply further comprises arranging a second diode. An anode of the second diode is connected to a second end of the X-capacitor, and a cathode of the second diode is connected to the first node.

Optionally, the X-capacitor discharge method applied to the switched-mode power supply further comprises arranging a first detection circuit, a first circuit and a first full-down circuit. When the first circuit needs power, the first circuit generates the first pull-down current, and the X-capacitor discharges to the first circuit; when the first circuit does not need power, the first pull-down circuit generates a second pull-down current.

Optionally, the X-capacitor discharge method applied to the switched-mode power supply further comprises arranging a first pass transistor. A first end of the first pass transistor is connected to the first node, and a second end of the first pass transistor is connected to the first circuit and the first pull-down circuit. A control end of the first pass transistor is connected to the first detection circuit. The first pass transistor is controlled to be turned on/off according to a detection result of the first detection circuit.

Optionally, the first detection circuit is disabled when the first pass transistor is turned on, and the first detection circuit is enabled when the first pass transistor is turned off.

The present invention further provides an X-capacitor discharge circuit applied to a switched-mode power supply. The switched-mode power supply comprises an X-capacitor, a rectifier circuit and a switching circuit. An alternating current (AC) input passes through the X-capacitor and the rectifier circuit to obtain an input voltage of the switching circuit. The X-capacitor discharge circuit comprises a first diode. An anode of the first diode is connected to a first end of the X-capacitor, and a cathode of the first diode is configured as a first node.

When it is detected that a voltage of the first node is higher than a first voltage threshold, the X-capacitor discharge circuit pulls down the first node through a first sampling current, and a timing is performed; and if a time for which the voltage of the first node continues to be higher than the first voltage threshold reaches a first threshold time, the X-capacitor discharge circuit pulls down the first node through a first pull-down current.

Optionally, the X-capacitor discharge circuit applied to the switched-mode power supply further comprises a second diode. An anode of the second diode is connected to a second end of the X-capacitor, and a cathode of the second diode is configured as a second node.

When it is detected that a voltage of the second node is higher than a second voltage threshold, the X-capacitor discharge circuit pulls down the second node through a second sampling current, and a timing is performed; and if a time for which the voltage of the second node continues to be higher than the second voltage threshold reaches a second threshold time, the X-capacitor discharge circuit pulls down the second node through a second pull-down current.

Optionally, when it is detected that the voltage of the first node is lower than the first voltage threshold, the X-capacitor discharge circuit pulls down the first node through a first sampling current, and a timing is performed; and if a time for which the voltage of the first node continues to be lower than the first voltage threshold reaches a third threshold time, the switching circuit is activated to discharge the input voltage, so that the input voltage is less than the first voltage threshold.

Optionally, a safety time comprises a first time period and a second time period. When it is detected that the voltage of the first node is higher than the first voltage threshold, within the safety time, the first node is not pulled down during the first time period, and the first node is pulled down through the first sampling current during the second time period. The first sampling current is greater than a set threshold current.

Optionally, the threshold current is set according to a maximum parasitic capacitance of the first node.

Optionally, the X-capacitor discharge circuit applied to the switched-mode power supply further comprises a second diode. An anode of the second diode is connected to a second end of the X-capacitor, and a cathode of the second diode is connected to the first node.

Optionally, the X-capacitor discharge circuit applied to the switched-mode power supply further comprises a first pull-down circuit, a first detection circuit, a second pull-down circuit, a second detection circuit and a logic control circuit. The first pull-down circuit is connected to the first node. The first detection circuit detects a voltage of the first node and outputs a first sampling voltage. The second pull-down circuit is connected to the second node. The second detection circuit detects a voltage of the second node and outputs a second sampling voltage. The logic control circuit receives the first sampling voltage and the second sampling voltage, and controls the first pull-down current of the first pull-down circuit and the second pull-down current of the second pull-down circuit according to the first sampling voltage and the second sampling voltage, respectively.

Optionally, the X-capacitor discharge circuit applied to the switched-mode power supply further comprises a first pull-down circuit, a first detection circuit and a logic control circuit. The first pull-down circuit is connected to the first node. The first detection circuit detects a voltage of the first node and outputs a first sampling voltage. The logic control circuit receives the first sampling voltage and controls the first pull-down current of the first pull-down circuit according to the first sampling voltage.

Optionally, the switching circuit is controlled to be activated according to the first sampling voltage to discharge the input voltage.

Optionally, the X-capacitor discharge circuit applied to the switched-mode power supply further comprises a first detection circuit, a first circuit, and a first pull-down circuit. The first detection circuit is connected to the first node to detect a voltage of the first node. When the voltage of the first node is higher than a first voltage threshold, the first sampling current is generated to pull down the first node, and a first timing is performed. And when a first time reaches a first threshold time, the first node is pulled down through the first pull-down current or a second pull-down current, wherein the voltage of the first node continues to be higher than the first voltage threshold in the first time. When the first circuit needs power, the first circuit generates the first pull-down current, and the X-capacitor discharges to the first circuit. When the first circuit does not need power, the first pull-down circuit generates the second pull-down current.

Optionally, the X-capacitor discharge circuit applied to the switched-mode power supply further comprises a first pass transistor. A first end of the first pass transistor is connected to the first node, and a second end of the first pass transistor is connected to the first circuit and the first pull-down circuit. A control end of the first pass transistor is connected to the first detection circuit. The first pass transistor is controlled to be turned on/off according to a detection result of the first detection circuit.

Optionally, the first detection circuit is disabled when the first pass transistor is turned on, and the first detection circuit is enabled when the first pass transistor is turned off.

Optionally, the X-capacitor discharge circuit applied to the switched-mode power supply further comprises a second diode, a second detection circuit and a second pull-down circuit. An anode of the second diode is connected to a second end of the X-capacitor, and a cathode of the second diode is configured as a second node. The second detection circuit is connected to the second node to detect a voltage of the second node. When the voltage of the second node is higher than a second voltage threshold, a second sampling current is generated to pull down the second node, and a second timing is performed. When a second time reaches a second threshold time, the second node is pulled down through the third pull-down current or a fourth pull-down current, wherein the voltage of the second node continues to be higher than the second voltage threshold in the second time. When the first circuit needs power, the first circuit generates the third pull-down current, and the X-capacitor discharges to the first circuit. When the first circuit does not need power, the second pull-down circuit generates the fourth pull-down current.

Optionally, the X-capacitor discharge circuit applied to the switched-mode power supply further comprises a second pass transistor. A first end of the second pass transistor is connected to the second node, a second end of the second pass transistor is connected to the first circuit and the second pull-down circuit. A control end of the second pass transistor is connected to the second detection circuit. The second pass transistor is controlled to be turned on/off according to a detection result of the second detection circuit.

Optionally, the second detection circuit is disabled when the second pass transistor is turned on, and the second detection circuit is enabled when the second pass transistor is turned off.

Optionally, when it is detected that the voltage of the first node is lower than the first voltage threshold, the first node is pulled down through the first sampling current, and a third timing is performed. When a third time reaches a third threshold time, the switching circuit is activated to discharge the input voltage, so that the input voltage is less than the first voltage threshold, wherein the voltage of the first node continues to be lower than the first voltage threshold in the third time.

The present invention further provides a switched-mode power supply. The switched-mode power supply comprises the X-capacitor discharge circuit according to the present invention.

Compared with the prior art, the circuit structure and method according to the present invention have the following advantages. In the present invention, it can be accurately detected that the input is powered off even when the input is distorted, and the input voltage can be discharged in time when the input is powered off. The power supply circuit can be discharged as needed. In this way, the efficiency of the system is improved, the power dissipation is lowered, and the discharge time can satisfy the safety standard requirements.

DETAILED DESCRIPTION OF THE EMBODIMENTS

The preferred embodiments of the present invention are described in detail below in conjunction with the drawings, but the present invention is not limited to these embodiments. The present invention covers any substitution, modification, equivalent method and scheme made within the spirit and scope of the present invention.

In order to enable readers to have a thorough understanding of the present invention, the specific details are described in detail in the following preferred embodiments of the present invention, but the present invention can be fully understood for those skilled in the art without the description of these details.

Hereinafter, the present invention is described more specifically in an exemplary manner with reference to the drawings. It should be noted that the drawings are all in a simplified form and all use imprecise scales, which are only used to conveniently and clearly assist in illustrating the objectives of the embodiments of the present invention.

Figure 1:
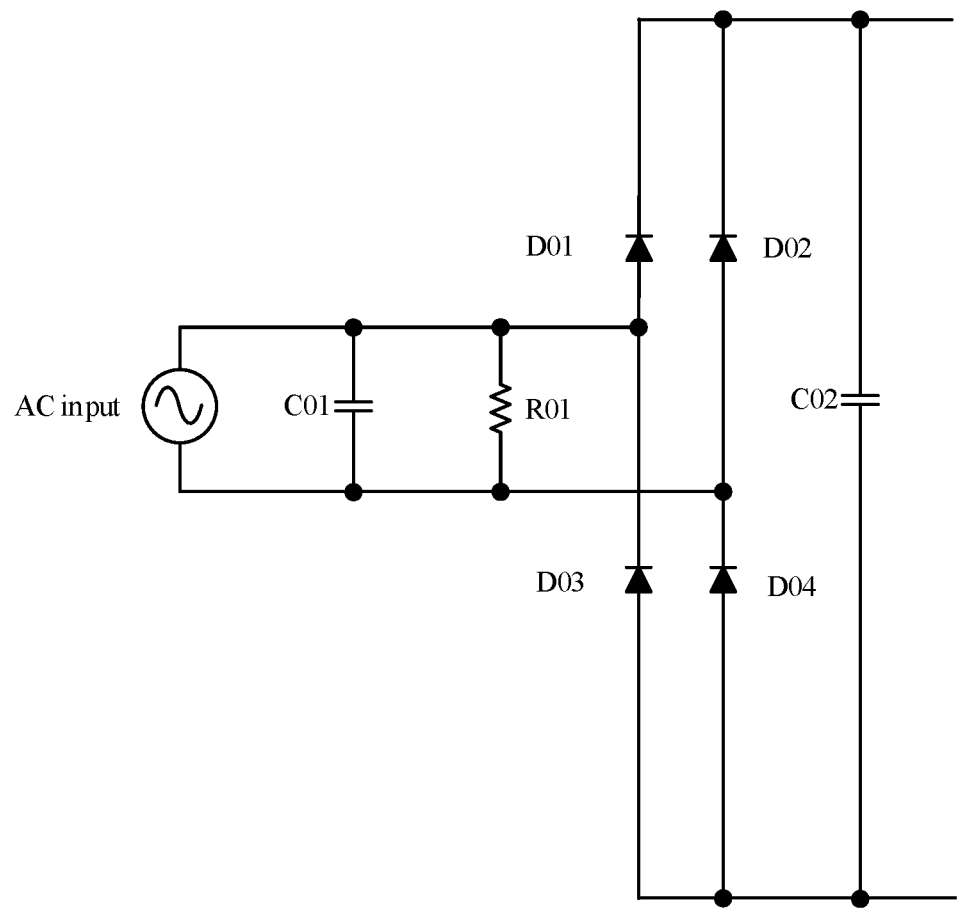
FIG. 1 shows a first circuit diagram of an X-capacitor discharge method in the prior art.
Figure 2:
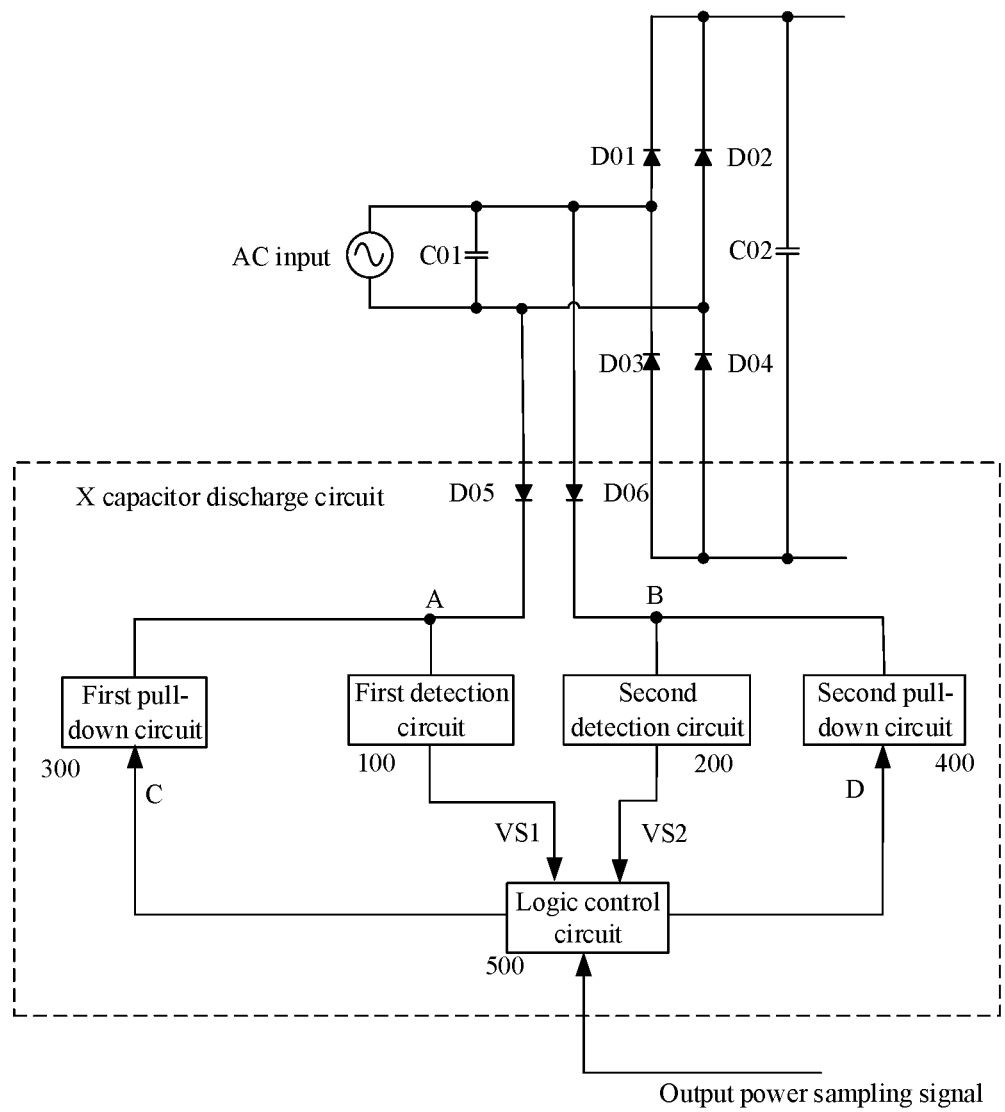
FIG. 2 shows a schematic diagram of an X-capacitor discharge circuit according to Embodiment 1 of the present invention.

FIG. 2 shows a schematic diagram of an X-capacitor discharge circuit applied to a switched-mode power supply according to Embodiment 1 of the present invention. The switched-mode power supply includes an X-capacitor C01 connected to an input end. The X-capacitor discharge circuit in FIG. 2 includes a first diode D05 and a second diode D06. The anode of the first diode D05 and the anode of the second diode D06 are connected to both ends of the X-capacitor C01 respectively. The cathode of the first diode D05 is configured as a first node A, and the cathode of the second diode D06 is configured as a second node B. The X-capacitor discharge circuit further includes a first pull-down circuit 300, a first detection circuit 100, a second detection circuit 200, a second pull-down circuit 400 and a logic control circuit 500. The first pull-down circuit 300 is connected to the first node A. The first detection circuit 100 detects the voltage of the node A, and outputs a first sampling voltage VS1. The second pull-down circuit 400 is connected to the second node B. The second detection circuit 200 detects the voltage of the node B, and outputs a second sampling voltage VS2. The logic control circuit 500 receives the first sampling voltage VS1 and the second sampling voltage VS2, controls a first pull-down current of the first pull-down circuit 300 and a second pull-down current of the second pull-down circuit 400 according to the first sampling voltage VS1 and the second sampling voltage VS2, respectively. The magnitude of the first pull-down current may be equal or not equal to that of the second pull-down current.

Figure 5:
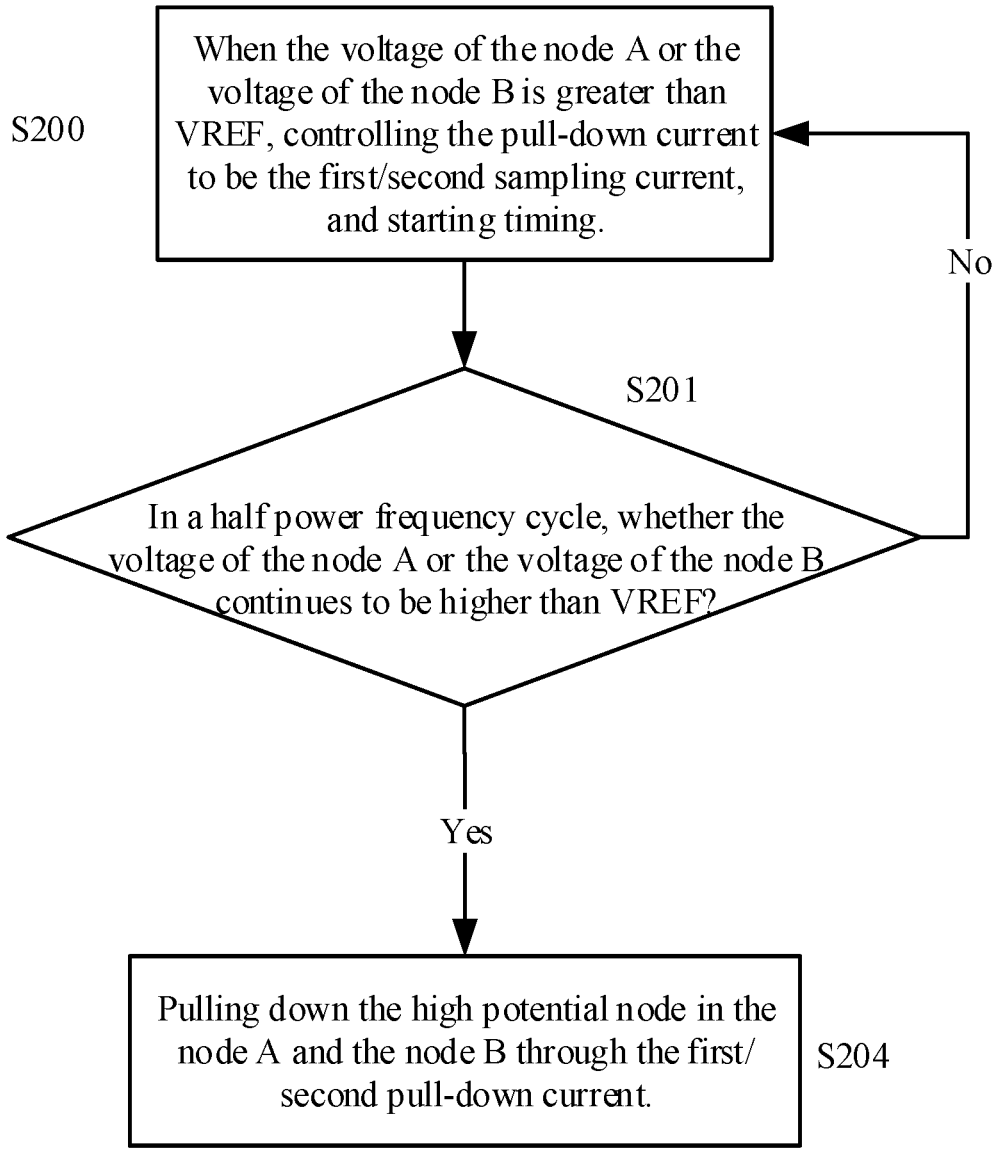
FIG. 5 schematically shows a workflow chart of an X-capacitor discharge method according to Embodiment 1 of the present invention.

FIG. 5 schematically shows a workflow chart of the X-capacitor discharge circuit according to the Embodiment 1.

Step S200: when the voltage of the node A is greater than a first voltage threshold, the X-capacitor discharge circuit pulls down the first node A through the first sampling current, and a timing is started; and/or when the voltage of the node B is greater than a second voltage threshold, the X-capacitor discharge circuit pulls down the second node B through the second sampling current, and a timing is started. The magnitude of the first sampling current may be equal or not equal to that of the second sampling current.

Step S201: within a first time, it is determined whether the voltage of the node A continues to be higher than the first voltage threshold; and/or within a second time, it is determined whether the voltage of the node B continues to be higher than the second voltage threshold. If yes, proceeding to step S204; if no, returning to step S200.

Step S204: it is indicated that the input is powered off, and the X-capacitor discharge circuit pulls down the high potential node in the first node A and/or in the second node B, wherein the node A corresponds to the first pull-down current, and the node B corresponds to the second pull-down current.

In an embodiment, the first time and/or the second time may be a half power frequency cycle. A power grid with a frequency of 50 Hz, for example, has a half power frequency cycle of 10 ms. The magnitude of the first sampling current and/or of the second sampling current may be on the microampere level, and the magnitude of the first pull-down current and/or of the second pull-down current may be on the milliampere level. In step S200, the node is pulled down through the first sampling current within a safety time. The safety time is divided into a first time period and a second time period. The first node is not pulled down during the first time period, and is pulled down through the first sampling current during the second time period. The first sampling current and/or the second sampling current is greater than the set threshold current, and the threshold current is set according to the maximum parasitic capacitance of the node A.

When the input is powered off, the discharge is performed through the first pull-down current on the milliampere level, and the discharge time can meet the safety requirements. When the system is working, the node can be pulled down through the current on the microampere level to minimize the power consumption of the X-capacitor discharge circuit, thereby improving the efficiency of the system.

When the output power is greater than a certain value and the input is powered off, the voltage on the X-capacitor will be consumed by the output, and thus will decrease rapidly, so as to meet the safety requirements. When the output power is small, it is necessary to discharge the X-capacitor when the input is powered off. When the output power of the switched-mode power supply is higher than the first threshold, the X-capacitor discharge circuit is not enabled, that is, the first pull-down circuit 300 and the second pull-down circuit 400 do not pull down, and the first detection circuit 100 and the second detection circuit 200 stop sampling.

Figure 3:
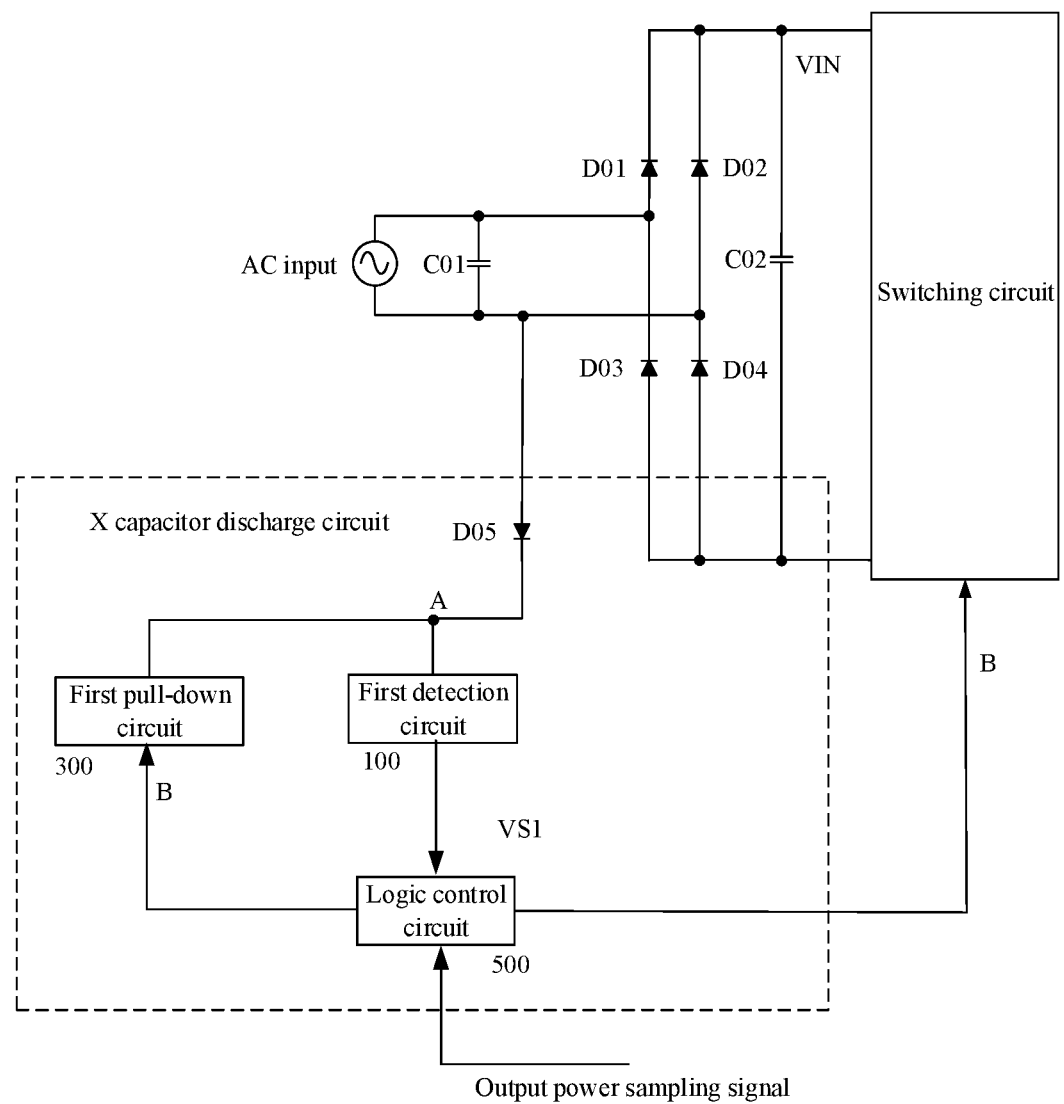
FIG. 3 shows a schematic diagram of an X-capacitor discharge circuit according to Embodiment 2 of the present invention.

FIG. 3 shows a schematic diagram of an X-capacitor discharge circuit according to Embodiment 2 of the present invention. The switched-mode power supply includes an X-capacitor C01 connected to an input end. The AC input passes through the X-capacitor and a rectifier circuit to obtain an input voltage VIN of the switched-mode power supply. The X-capacitor discharge circuit includes a first diode D05. The anode of the first diode D05 is connected to one end of the X-capacitor C01, and the cathode of the first diode D05 is configured as a first node A. The X-capacitor discharge circuit further includes a first pull-down circuit 300, a first detection circuit 100 and a logic control circuit 500. The first pull-down circuit 300 is connected to the first node A. The first detection circuit 100 detects the voltage of the node A and outputs a first sampling voltage VS1. The logic control circuit 500 receives the first sampling voltage VS1, and controls the pull-down current of the first pull-down circuit 300 and the switched-mode power supply according to the first sampling voltage VS1.

Figure 6:
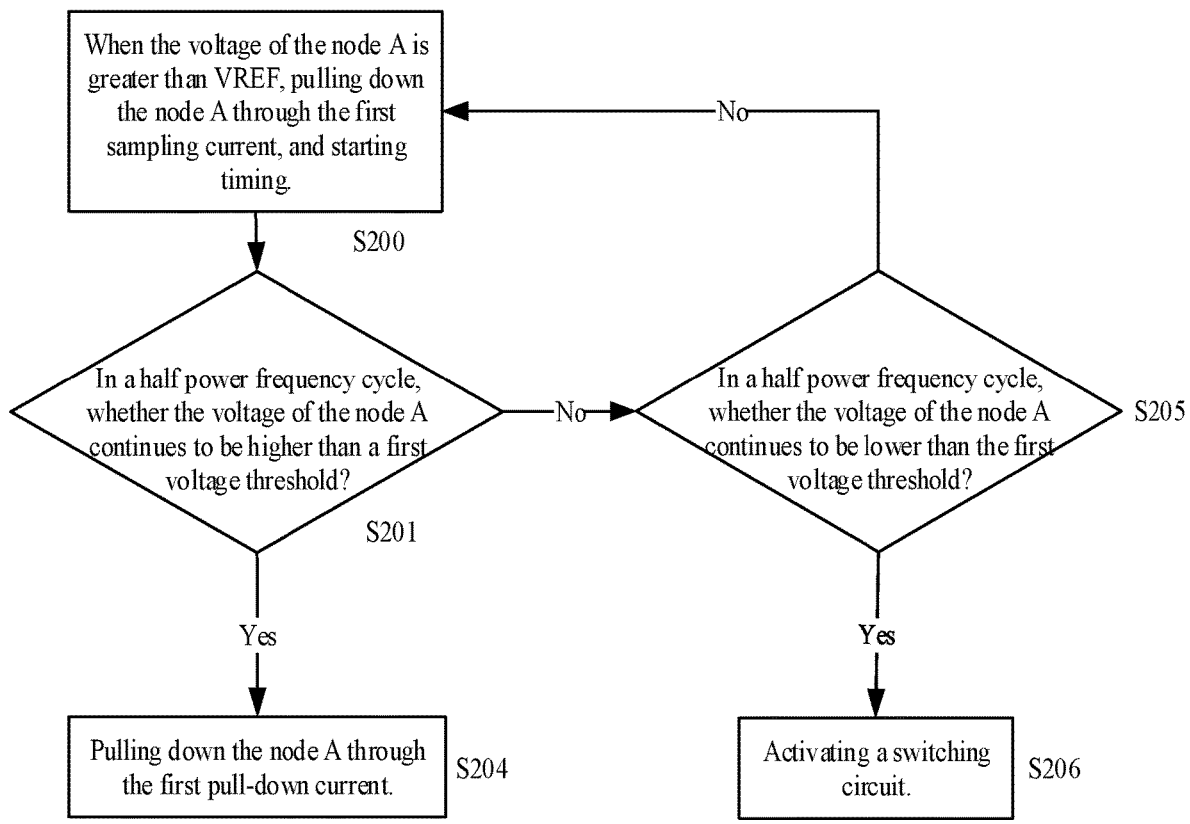
FIG. 6 schematically shows a workflow chart of an X-capacitor discharge method according to Embodiment 2 of the present invention.

FIG. 6 schematically shows a workflow chart of the X-capacitor discharge circuit according to the Embodiment 2.

Step S200: when the voltage of the node A is less than a first voltage threshold, the X-capacitor discharge circuit pulls down the first node A through the first sampling current, and a timing is started.

Step S201: in a half power frequency cycle, it is determined whether the voltage of the node A continues to be higher than the first voltage threshold; if yes, proceeding to step S204; if no, proceeding to step S205.

Step S204: it is indicated that the input is powered off, and the X-capacitor discharge circuit pulls down the first node A through the first pull-down current.

Step S205: in a half power frequency cycle, it is determined whether the voltage of the node A continues to be lower than the first voltage threshold; if yes, proceeding to step S206; if no, returning to step S200.

Step S206: the switching circuit is activated to discharge the input voltage, so that the input voltage is lower than the first voltage threshold.

Figure 4:
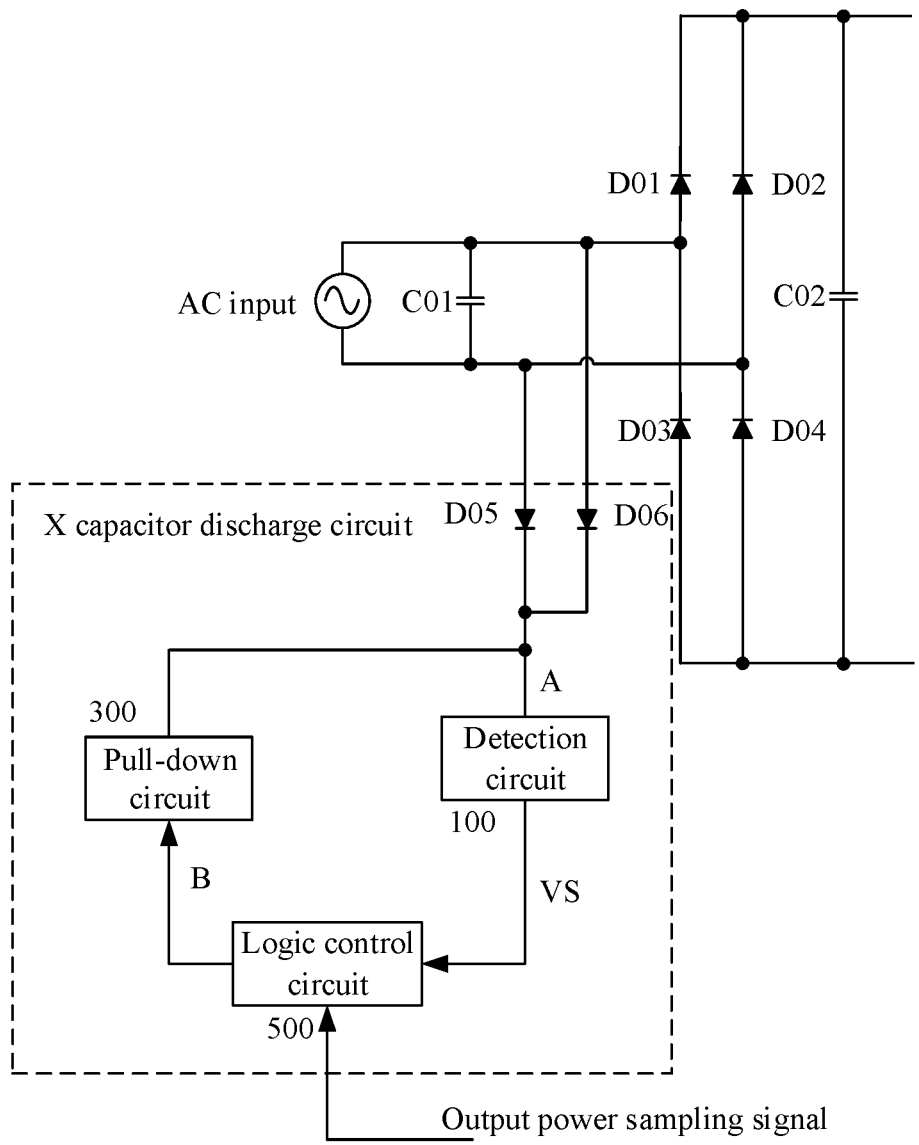
FIG. 4 shows a schematic diagram of an X-capacitor discharge circuit according to Embodiment 3 of the present invention.

FIG. 4 shows a schematic diagram of an X-capacitor discharge circuit according to Embodiment 3 of the present invention. The X-capacitor discharge circuit includes a first diode D05 and a second diode D06. The anode of the first diode D05 and the anode of the second diode D06 are connected to both ends of the X-capacitor C01, respectively. The cathode of the first diode D05 and the cathode of the second diode D06 are connected to each other, to form a common node configured as a first node A. The X-capacitor discharge circuit further includes a pull-down circuit 300, a detection circuit 100 and a logic control circuit 500. The pull-down circuit 300 is connected to the first node A. The detection circuit 100 detects the rectified voltage and outputs a sampling voltage VS. The logic control circuit 500 receives the sampling voltage VS, and controls the pull-down current of the pull-down circuit 300 according to the sampling voltage VS.

Figure 7:
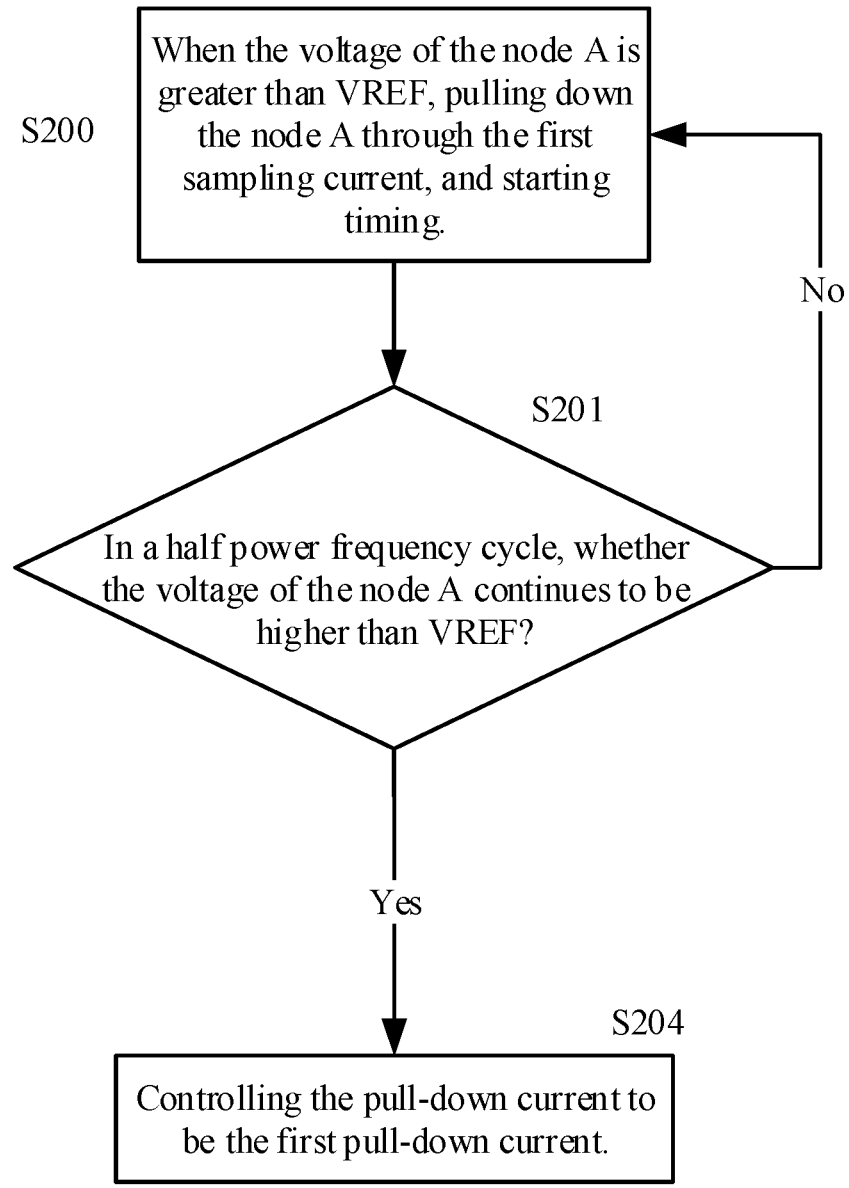
FIG. 7 schematically shows a workflow chart of an X-capacitor discharge method according to Embodiment 3 of the present invention.

FIG. 7 schematically shows a workflow chart of the X-capacitor discharge circuit according to the Embodiment 3.

Step S200: when the voltage of the node A is greater than a first voltage threshold, the X-capacitor discharge circuit pulls down the first node A through the first sampling current, and a timing is started.

Step S201: within a first time, it is determined whether the rectified voltage continues to be higher than the first voltage threshold; if yes, proceeding to step S204; if no, returning to step S200.

Step S204: it is indicated that the input is powered off, and the X-capacitor discharge circuit pulls down the first node A through the first pull-down current.

In Embodiment 3, when the input voltage is severely distorted, it may be detected that the voltage of the node A continues to be greater than the first voltage threshold for a half power frequency cycle even when the input voltage is not powered off, thereby mistakenly detecting that the input is powered off. In Embodiments 1 and 2, however, it can be detected that the input is powered off even when the input is severely distorted, and the input voltage can be discharged in time. Within the safety time, solely setting the first sampling current based on the parasitic capacitance of the node, can avoid the situations of sampling and/or pulling down multiple times.

Figure 8:
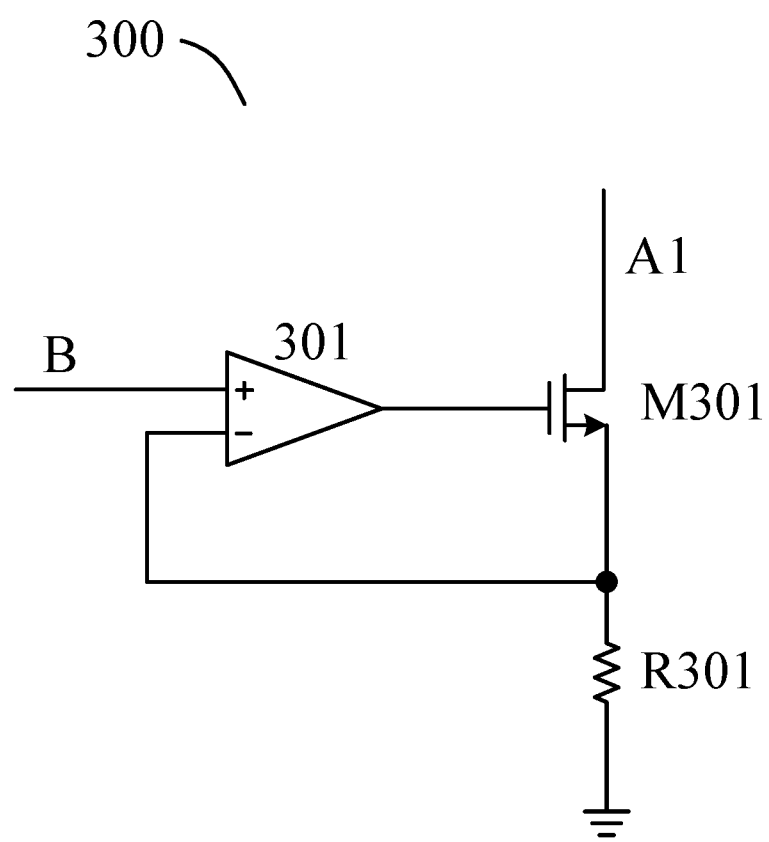
FIG. 8 shows a schematic diagram of a pull-down circuit according to an embodiment of the present invention.

FIG. 8 shows an embodiment of the pull-down circuit 300 or the pull-down circuit 400. The pull-down circuit includes an operational amplifier 301, a switching transistor M301, and a resistor R301. The resistor R301 detects the current passing through the switching transistor M301. The inverting input end of the operational amplifier 301 receives a sampling voltage on the resistor R301, and the non-inverting input end of the operational amplifier 301 is connected to the reference voltage B. The output end of the operational amplifier 301 is connected to the control end of the switching transistor M301. The operational amplifier 301 adjusts the control electrode of the switching transistor M301 to enable the voltage generated by the current flowing through the resistor R301 to approach the reference voltage A1. A logic control circuit 500 controls the reference voltage A1 to control the current of the switching transistor M301, that is, to control the pull-down current.

The first detection circuit 100 or the second detection circuit 200 may perform sampling by using a voltage dividing resistor. Taking the first detection circuit 100 as an example, the voltage dividing resistor of the first detection circuit 100 will also pull down the first node A, i.e., a pull-down current is generated. Therefore, when setting the pull-down current of the first pull-down circuit 300, the pull-down current of the voltage dividing resistor needs to be considered to enable the sum of the pull-down current of the first pull-down circuit 300 and the pull-down current of the first detection circuit 100 to be approximately equal to the pull-down current required by the first node.

Figure 9:
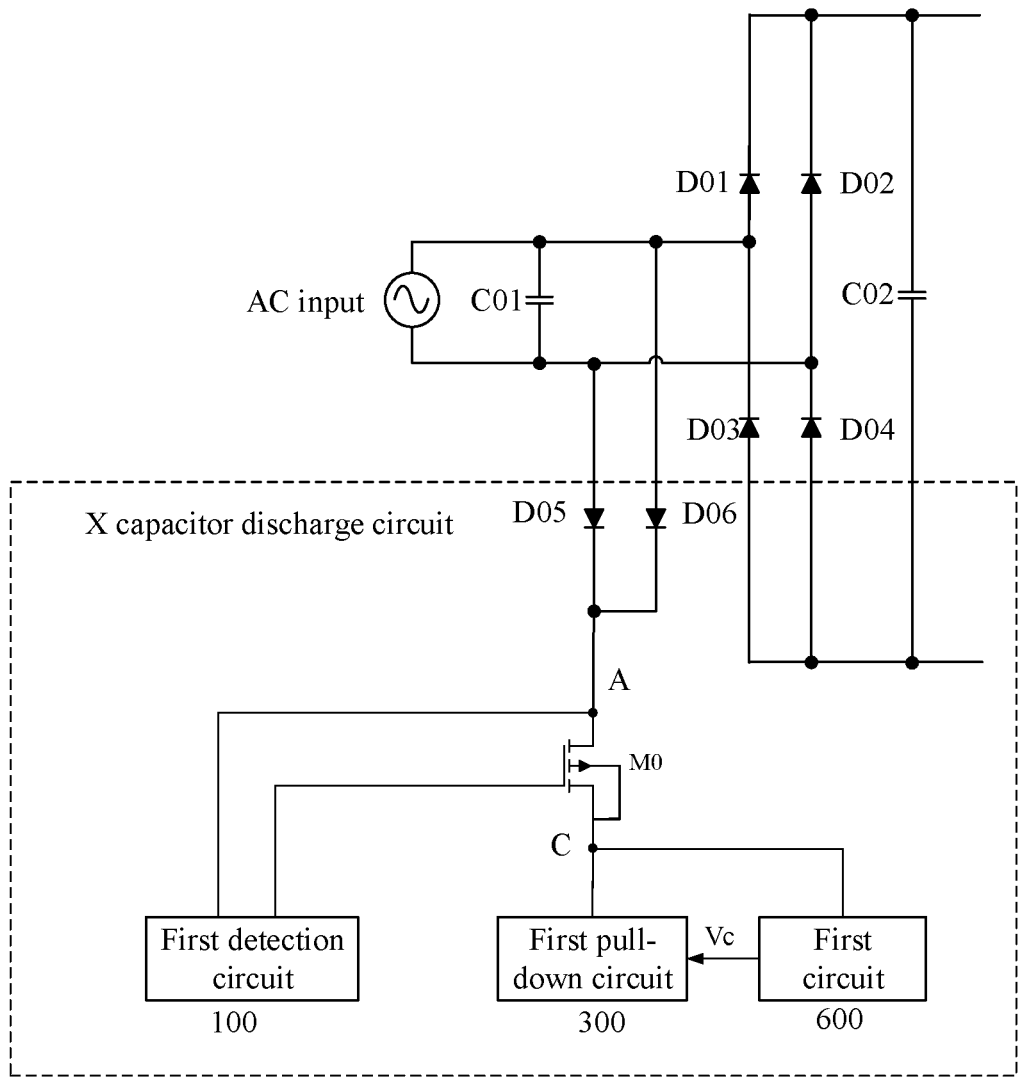
FIG. 9 shows a schematic diagram of an X-capacitor discharge circuit according to Embodiment 4 of the present invention.

FIG. 9 shows a schematic diagram of an X-capacitor discharge circuit applied to a switched-mode power supply according to Embodiment 4 of the present invention. The switched-mode power supply includes an X-capacitor C01 connected at an input end. The X-capacitor discharge circuit includes a first diode D05 and a second diode D06. The anode of the first diode D05 and the anode of the second diode D06 are connected to the both ends of the X-capacitor C01, respectively. The cathode of the first diode D05 and the cathode of the second diode D06 are connected to each other, to form a first node A. The X-capacitor discharge circuit further includes a pass transistor M0, a first pull-down circuit 300, a first detection circuit 100, and a first circuit 600. A first end of the first detection circuit 100 is connected to the node A, and a second end of the first detection circuit 100 is connected to the control end of the pass transistor M0. A first end of the pass transistor M0 is connected to the node A, and a second end of the pass transistor M0 is connected to the first pull-down circuit 300 and the first circuit 600. The first circuit 600 is connected with the first pull-down circuit 300. The first detection circuit 100 detects the voltage of the node A. When the voltage of the node A is greater than a first voltage threshold, the node A is pulled down through a first sampling current. When the voltage of the node A continues to be greater than the first voltage threshold for a first time, the pass transistor M0 is turned on. When the first circuit 600 needs power, the first circuit 600 generates a first pull-down current to pull down the node A, and the X-capacitor discharges to the first circuit 600. When the first circuit 600 does not need power, the first pull-down circuit 300 generates a second pull-down current to pull down the node A, and the X-capacitor discharges to the ground. When the pass transistor M0 is turned on, the first detection circuit 100 is disabled. The first circuit 600 is generally a circuit power supply.

Figure 10:
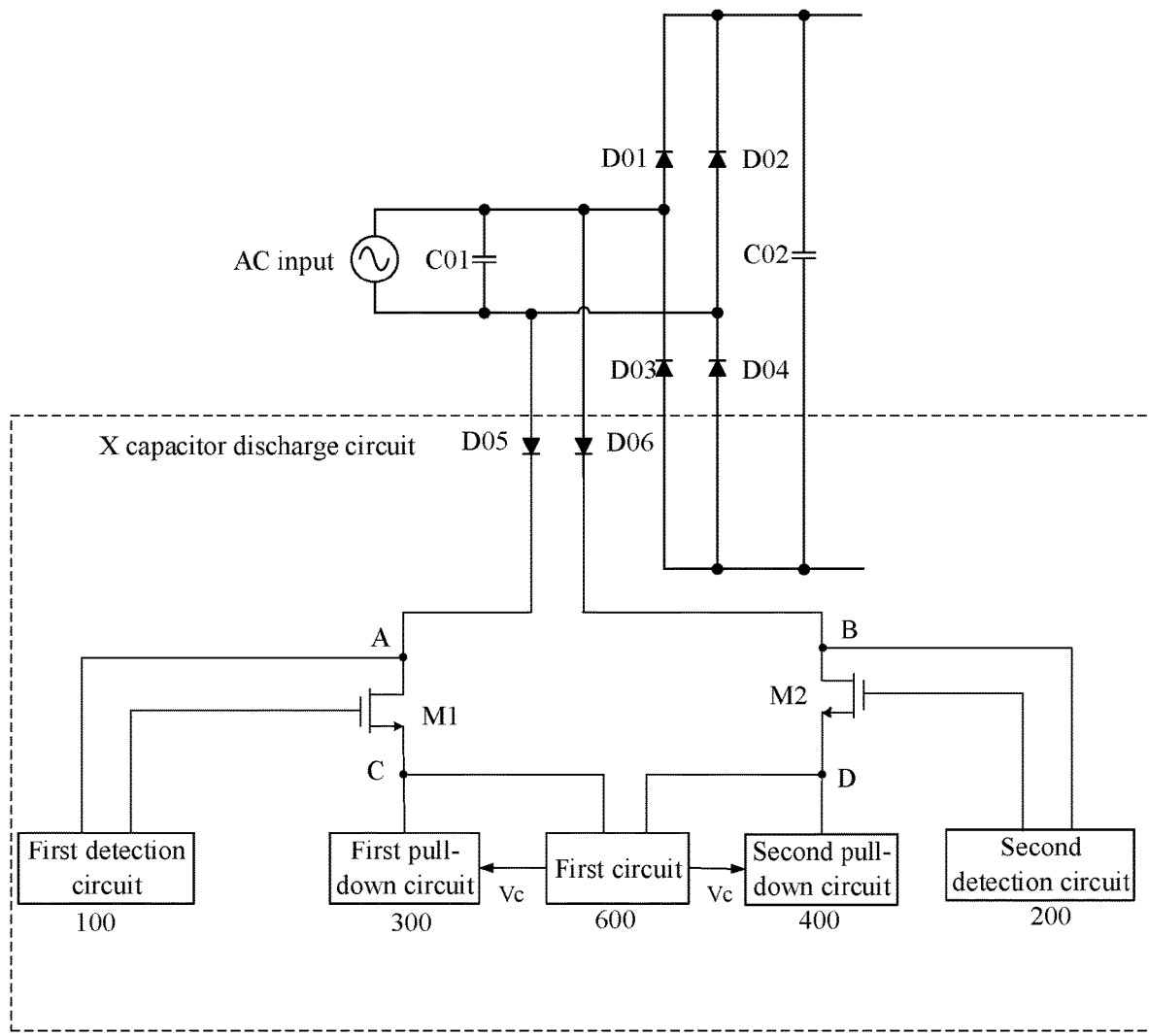
FIG. 10 shows a schematic diagram of an X-capacitor discharge circuit according to Embodiment 5 of the present invention.

FIG. 10 shows a schematic diagram of an X-capacitor discharge circuit applied to a switched-mode power supply according to Embodiment 5 of the present invention. The switched-mode power supply includes an X-capacitor C01 connected at the input end. The X-capacitor discharge circuit includes a first diode D05 and a second diode D06. The anode of the first diode D05 and the anode of the second diode D06 are connected to the both ends of the X-capacitor C01, respectively. The cathode of the first diode D05 is configured as the first node A, and the cathode of the second diode D06 is configured as the second node B. The X-capacitor discharge circuit further includes a first pass transistor M1, a first pull-down circuit 300, a first detection circuit 100, a first circuit 600, a second pass transistor M2, a second pull-down circuit 400, and a second detection circuit 200. A first end of the first detection circuit 100 is connected to the node A, and a second end of the first detection circuit 100 is connected to the control end of the pass transistor M1. A first end of the pass transistor M1 is connected to the node A, and a second end of the pass transistor M1 is connected to the first pull-down circuit 300 and the first circuit 600. The first circuit 600 is connected with the first pull-down circuit 300. A first end of the second detection circuit 200 is connected to the node B, and a second end of the second detection circuit 200 is connected to the control end of the pass transistor M2. A first end of the pass transistor M2 is connected to the node B, and a second end of the pass transistor M2 is connected to the second pull-down circuit 400 and the first circuit 600. The first circuit 600 is connected with the second pull-down circuit 400.

The first detection circuit 100 detects the voltage of the node A. When the voltage of the node A is greater than a first voltage threshold, the node A is pulled down through a first sampling current. When the voltage of the node A continues to be greater than the first voltage threshold for a first time, the pass transistor M1 is turned on. When the first circuit 600 needs power, the first circuit 600 generates a first pull-down current to pull down the node A, and the X-capacitor discharges to the first circuit 600. When the first circuit 600 does not need power, the first pull-down circuit 300 generates a second pull-down current to pull down the node A, and the X-capacitor discharges to the ground. When the pass transistor M1 is turned on, the first detection circuit 100 is disabled. The second detection circuit 200 detects the voltage of the node B. When the voltage of the node B is greater than a second voltage threshold, the node B is pulled down through a second sampling current. When the voltage of the node B continues to be greater than the second voltage threshold for a second time, the pass transistor M2 is turned on. When the first circuit 600 needs power, the first circuit 600 generates a third pull-down current to pull down the node B, and the X-capacitor discharges to the first circuit 600. When the first circuit 600 does not need power, the second pull-down circuit 400 generates the fourth pull-down current to pull down the node B, and the X-capacitor discharges to the ground. When the pass transistor M2 is turned on, the second detection circuit 200 is disabled. The first circuit 600 is generally a circuit power supply. In the embodiment, when the input voltage is severely distorted, the power off of the input can be detected, and the X-capacitor can be discharged in time.

Figure 11:
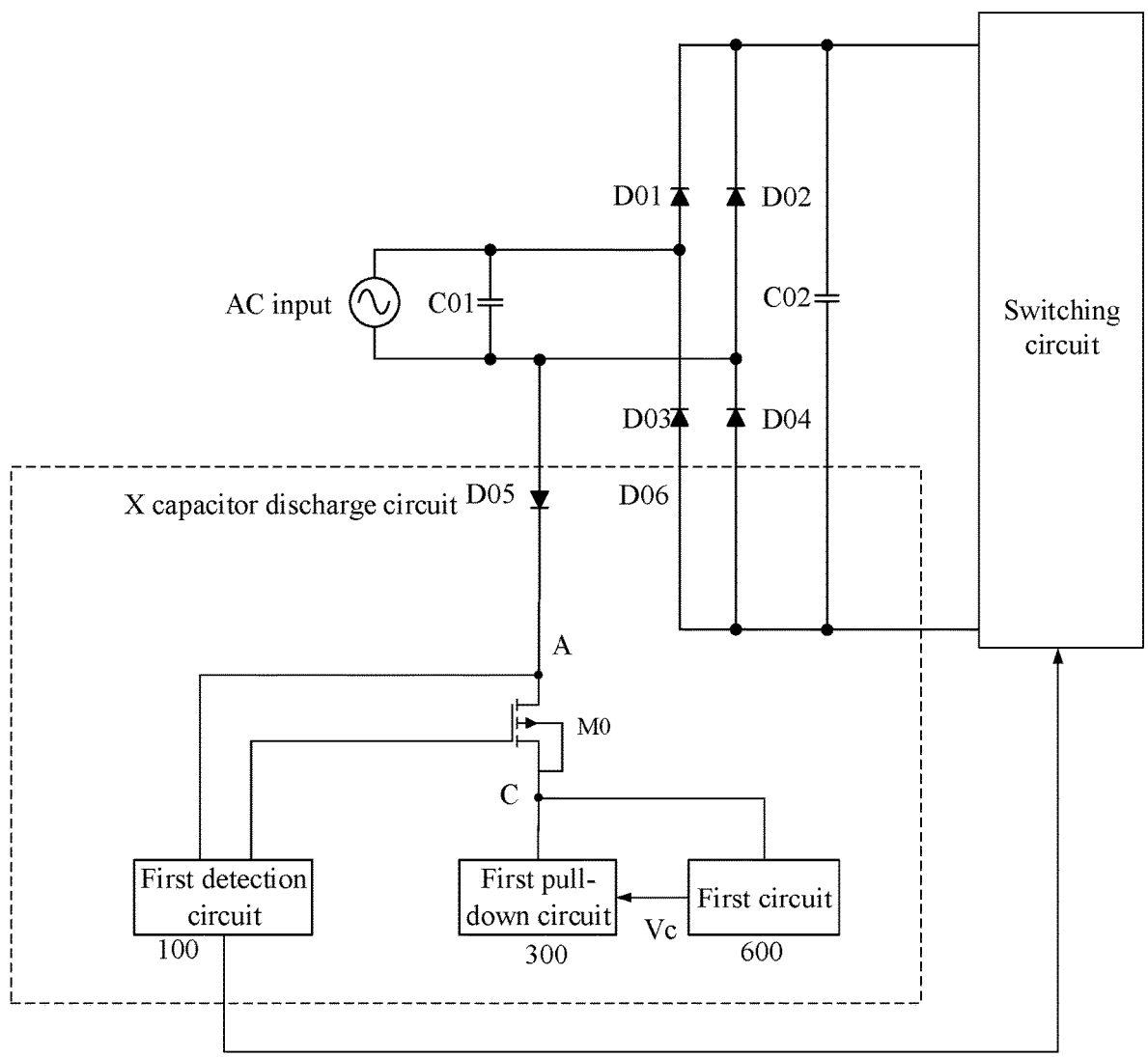
FIG. 11 shows a schematic diagram of an X-capacitor discharge circuit according to Embodiment 6 of the present invention.

FIG. 11 shows a schematic diagram of an X-capacitor discharge circuit applied to a switched-mode power supply according to Embodiment 6 of the present invention. The switched-mode power supply includes an X-capacitor C01 connected at the input end. An AC input supplies power to a switching circuit through the X-capacitor and a rectifier circuit. The X-capacitor discharge circuit includes a first diode D05. The anode of the first diode D05 is connected to one end of the X-capacitor C01, and the cathode of the first diode D05 is configured as a node A. The X-capacitor discharge circuit further includes a pass transistor M0, a first pull-down circuit 300, a first detection circuit 100, and a first circuit 600. A first end of the first detection circuit 100 is connected to the node A, and a second end of the first detection circuit 100 is connected to the control end of the pass transistor M0. A first end of the pass transistor M0 is connected to the node A, and a second end of the pass transistor M0 is connected to the first pull-down circuit 300 and the first circuit 600. The first circuit 600 is connected with the first pull-down circuit 300. The first detection circuit 100 detects the voltage of the node A. When the voltage of the node A is greater than the first voltage threshold, the node A is pulled down through a first sampling current. When the voltage of the node A continues to be greater than the first voltage threshold for a first time, the pass transistor M0 is turned on. When the first circuit 600 needs power, the first circuit 600 generates a first pull-down current to pull down the node A, and the X-capacitor discharges to the first circuit 600. When the first circuit 600 does not need power, the first pull-down circuit 300 generates a second pull-down current to pull down the node A, and the X-capacitor discharges to the ground. When the pass transistor M0 is turned on, the first detection circuit 100 is disabled. When the first detection circuit 100 detects that the time for which the voltage of the node A continues to be lower than the first voltage threshold reaches a threshold time, the switching circuit is activated to discharge the input voltage, so that the input voltage is enabled to be less than the first voltage threshold. The first circuit 600 is generally a circuit power supply.

Figure 12:
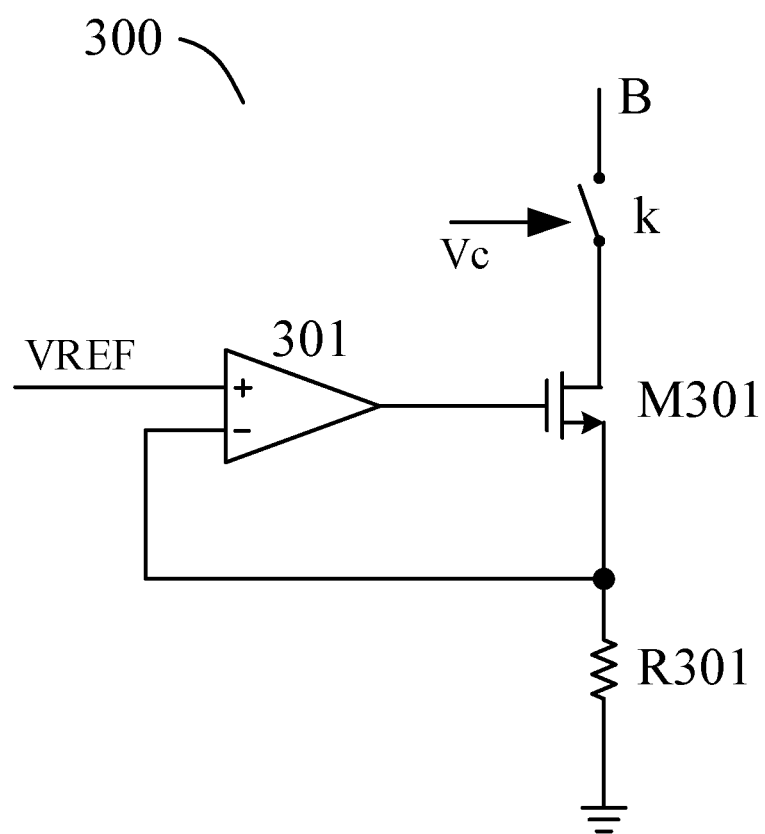
FIG. 12 shows a schematic diagram of a pull-down circuit according to another embodiment of the present invention.

FIG. 12 shows another embodiment of a pull-down circuit. The pull-down circuit includes an operational amplifier 301, a switching transistor M301, and a resistor R301. The resistor R301 samples the current passing through the switching transistor M301. The inverting input end of the operational amplifier 301 receives a sampling voltage on the resistor R301, and the non-inverting input end of the operational amplifier 301 is connected to a reference voltage VREF. The output end of the operational amplifier 301 is connected to a control end of the switching transistor M301. When the first circuit does not need power, the switch k is turned on, and the operational amplifier 301 adjusts the control electrode of the switching transistor M301, so that the voltage generated by the current passing through the resistor R301 approaches the reference voltage VREF.

In another technical solution according to the present invention, a switched-mode power supply is provided, including the X-capacitor discharge circuit according to the present invention and a switching circuit. The switching circuit may be an AC/DC circuit.

Although the above embodiments are described separately, some technologies involved are common to these embodiments. For those having ordinary skill in the art, replacements and integrations may be made between these embodiments, and the involved content not clearly recorded in one of the embodiments can refer to another embodiment that has recorded this content.

The aforementioned embodiments do not constitute a limitation on the scope of protection of the technical solution. Any modifications, equivalent replacements and improvements made within the spirit and principles of the aforementioned embodiments shall fall within the scope of protection of the technical solution of the present invention.

What is claimed is:

1. An X-capacitor discharge method applied to a switched-mode power supply, wherein the switched-mode power supply comprises an X-capacitor, a rectifier circuit and a switching circuit; an alternating current (AC) input passes through the X-capacitor and the rectifier circuit to obtain an input voltage of the switching circuit;

the X-capacitor discharge method comprises:
arranging a first diode, wherein an anode of the first diode is connected to a first end of the X-capacitor, and a cathode of the first diode is configured as a first node;
when it is detected that a voltage of the first node is higher than a first voltage threshold, pulling down the first node, and performing a first timing;
when a first time reaches a first threshold time, pulling down the first node, wherein the voltage of the first node continues to be higher than the first voltage threshold in the first time;
arranging a second diode, wherein an anode of the second diode is connected to a second end of the X-capacitor, and a cathode of the second diode is configured as a second node;
when it is detected that a voltage of the second node is higher than a second voltage threshold, pulling down the second node, and performing a second timing; and
when a second time reaches a second threshold time, pulling down the second node, wherein the voltage of the second node continues to be higher than the second voltage threshold in the second time.

2. The X-capacitor discharge method applied to the switched-mode power supply according to claim 1, wherein
a safety time comprises a first time period and a second time period;
when it is detected that the voltage of the first node is higher than the first voltage threshold, within the safety time, the first node is not pulled down during the first time period, and the first node is pulled down during the second time period.

3. The X-capacitor discharge method applied to the switched-mode power supply according to claim 1, further comprising:
arranging a second diode, wherein an anode of the second diode is connected to a second end of the X-capacitor, and a cathode of the second diode is connected to the first node.

4. The X-capacitor discharge method applied to the switched-mode power supply according to claim 1, further comprising:
arranging a first detection circuit, a first circuit and a first pull-down circuit, wherein when the first circuit needs power, the X-capacitor discharges to the first circuit.

5. The X-capacitor discharge method applied to the switched-mode power supply according to claim 4, further comprising:
arranging a first pass transistor, wherein a first end of the first pass transistor is connected to the first node, a second end of the first pass transistor is connected to the first circuit and the first pull-down circuit, a control end of the first pass transistor is connected to the first detection circuit, and the first pass transistor is controlled to be turned on/off according to a detection result of the first detection circuit.

6. The X-capacitor discharge method applied to the switched-mode power supply according to claim 4, wherein
the first detection circuit is disabled when a first pass transistor is turned on, and the first detection circuit is enabled when the first pass transistor is turned off.

7. An X-capacitor discharge method applied to a switched-mode power supply, wherein the switched-mode power supply comprises an X-capacitor, a rectifier circuit and a switching circuit: an alternating current (AC) input passes through the X-capacitor and the rectifier circuit to obtain an input voltage of the switching circuit;

the X-capacitor discharge method comprises:
arranging a first diode, wherein an anode of the first diode is connected to a first end of the X-capacitor, and a cathode of the first diode is configured as a first node;
when it is detected that a voltage of the first node is higher than a first voltage threshold, pulling down the first node, and performing a first timing;

when a first time reaches a first threshold time, pulling down the first node, wherein the voltage of the first node continues to be higher than the first voltage threshold in the first time;

when it is detected that the voltage of the first node is lower than the first voltage threshold, the first node is pulled down, and a third timing is performed;

when a third time reaches a third threshold time, the switching circuit is activated to discharge the input voltage to allow the input voltage to be less than the first voltage threshold, wherein the voltage of the first node continues to be lower than the first voltage threshold in the third time.

8. An X-capacitor discharge circuit applied to a switched-mode power supply, wherein the switched-mode power supply comprises an X-capacitor, a rectifier circuit and a switching circuit; an alternating current (AC) input passes through the X-capacitor and the rectifier circuit to obtain an input voltage of the switching circuit;

the X-capacitor discharge circuit comprises a first diode, wherein an anode of the first diode is connected to a first end of the X-capacitor, and a cathode of the first diode is configured as a first node;

when it is detected that a voltage of the first node is higher than a first voltage threshold, the X-capacitor discharge circuit pulls down the first node, and a first timing is performed;

when a first time reaches a first threshold time, the X-capacitor discharge circuit pulls down the first node, wherein the voltage of the first node continues to be higher than the first voltage threshold in the first time;

a second diode, wherein an anode of the second diode is connected to a second end of the X-capacitor, and a cathode of the second diode is configured as a second node;

when it is detected that a voltage of the second node is higher than a second voltage threshold, the X-capacitor discharge circuit pulls down the second node, and a second timing is performed; and when a second time reaches a second threshold time, the X-capacitor discharge circuit pulls down the second node, wherein the voltage of the second node continues to be higher than the second voltage threshold in the second time.

9. The X-capacitor discharge circuit applied to the switched-mode power supply according to claim 8, wherein when it is detected that the voltage of the first node is lower than the first voltage threshold, the X-capacitor discharge circuit pulls down the first node, and a third timing is performed; and when a third time reaches a third threshold time, the switching circuit is activated to discharge the input voltage to allow the input voltage to be less than the first voltage threshold, wherein the voltage of the first node continues to be lower than the first voltage threshold in the third time.

10. The X-capacitor discharge circuit applied to the switched-mode power supply according to claim 8, wherein a safety time comprises a first time period and a second time period;

when it is detected that the voltage of the first node is higher than the first voltage threshold, within the safety time, the first node is not pulled down during the first time period, and the first node is pulled down during the second time period.

11. The X-capacitor discharge circuit applied to the switched-mode power supply according to claim 8, further comprising a second diode, wherein an anode of the second diode is connected to a second end of the X-capacitor, and a cathode of the second diode is connected to the first node.

12. The X-capacitor discharge circuit applied to the switched-mode power supply according to claim 8, further comprising a first pull-down circuit, a first detection circuit, a second pull-down circuit, a second detection circuit and a logic control circuit; wherein the first pull-down circuit is connected to the first node;

the first detection circuit detects the voltage of the first node and outputs a first sampling voltage;

the second pull-down circuit is connected to the second node;

the second detection circuit detects a voltage of the second node and outputs a second sampling voltage;

the logic control circuit receives the first sampling voltage and the second sampling voltage, and controls the first pull-down circuit and the second pull-down circuit according to the first sampling voltage and the second sampling voltage, respectively.

13. The X-capacitor discharge circuit applied to the switched-mode power supply according to claim 8, further comprising a first pull-down circuit, a first detection circuit and a logic control circuit; wherein the first pull-down circuit is connected to the first node;

the first detection circuit detects the voltage of the first node and outputs a first sampling voltage;

the logic control circuit receives the first sampling voltage and controls the first pull-down circuit according to the first sampling voltage.

14. The X-capacitor discharge circuit applied to the switched-mode power supply according to claim 13, wherein the switching circuit is controlled to be activated according to the first sampling voltage to discharge the input voltage.

15. The X-capacitor discharge circuit applied to the switched-mode power supply according to claim 8, further comprising:

a first detection circuit, wherein the first detection circuit is connected to the first node to detect the voltage of the first node; wherein when the voltage of the first node is higher than the first voltage threshold, the first node is pulled down, and the first timing is performed; and when the first time reaches the first threshold time, the first node is pulled down, wherein the voltage of the first node continues to be higher than the first voltage threshold in the first time;

a first circuit, wherein when the first circuit needs power, the X-capacitor discharges to the first circuit; and a first pull-down circuit.

16. The X-capacitor discharge circuit applied to the switched-mode power supply according to claim 15, further comprising a first pass transistor, wherein a first end of the first pass transistor is connected to the first node;

a second end of the first pass transistor is connected to the first circuit and the first pull-down circuit;

a control end of the first pass transistor is connected to the first detection circuit; and the first pass transistor is controlled to be turned on/off according to a detection result of the first detection circuit.

17. The X-capacitor discharge circuit applied to the switched-mode power supply according to claim 16, wherein
the first detection circuit is disabled when the first pass transistor is turned on, and the first detection circuit is enabled when the first pass transistor is turned off.

18. The X-capacitor discharge circuit applied to the switched-mode power supply according to claim 15, further comprising:
a second diode, wherein an anode of the second diode is connected to a second end of the X-capacitor, and a cathode of the second diode is configured as a second node;
a second detection circuit, wherein the second detection circuit is connected to the second node to detect a voltage of the second node; wherein
when the voltage of the second node is higher than a second voltage threshold, the second node is pulled down, and a second timing is performed;
when a second time reaches a second threshold time, the second node is pulled down, wherein the voltage of the second node continues to be higher than the second voltage threshold in the second time; and
when the first circuit needs power, the X-capacitor discharges to the first circuit; and
a second pull-down circuit.

19. The X-capacitor discharge circuit applied to the switched-mode power supply according to claim 18, further comprising a second pass transistor; wherein
a first end of the second pass transistor is connected to the second node;
a second end of the second pass transistor is connected to the first circuit and the second pull-down circuit;
a control end of the second pass transistor is connected to the second detection circuit; and
the second pass transistor is controlled to be turned on/off according to a detection result of the second detection circuit.

20. The X-capacitor discharge circuit applied to the switched-mode power supply according to claim 19, wherein
the second detection circuit is disabled when the second pass transistor is turned on, and the second detection circuit is enabled when the second pass transistor is turned off.

21. The X-capacitor discharge circuit applied to the switched-mode power supply according to claim 15, wherein
when it is detected that the voltage of the first node is lower than the first voltage threshold, the first node is pulled down, and a third timing is performed;
when a third time reaches a third threshold time, the switching circuit is activated to discharge the input voltage to allow the input voltage to be less than the first voltage threshold, wherein the voltage of the first node continues to be lower than the first voltage threshold in the third time.

22. A switched-mode power supply, comprising the X-capacitor discharge circuit according to claim 8.

* * * * *